(12) United States Patent
Yin et al.

(10) Patent No.: US 11,303,840 B1
(45) Date of Patent: Apr. 12, 2022

(54) IMAGE SENSOR AND SENSING METHOD THEREOF WITH POLARIZERS FOR REMOVING BACKGROUND NOISE

(71) Applicant: Guangzhou Tyrafos Semiconductor Technologies Co., Ltd., Guangzhou (CN)

(72) Inventors: Ping-Hung Yin, Taipei (TW); Jia-Shyang Wang, Miaoli County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 17/155,139

(22) Filed: Jan. 22, 2021

(30) Foreign Application Priority Data

Nov. 30, 2020 (TW) .................................. 109142107

(51) Int. Cl.
| | |
|---|---|
| *H04N 5/378* | (2011.01) |
| *H04N 5/363* | (2011.01) |
| *G02F 1/1333* | (2006.01) |
| *G02F 1/1335* | (2006.01) |
| *G02F 1/13363* | (2006.01) |
| *H04N 5/361* | (2011.01) |

(52) U.S. Cl.
CPC ......... *H04N 5/378* (2013.01); *G02F 1/13338* (2013.01); *G02F 1/13363* (2013.01); *G02F 1/133528* (2013.01); *H04N 5/361* (2013.01); *H04N 5/363* (2013.01)

(58) Field of Classification Search
CPC ........ H04N 5/378; H04N 5/361; H04N 5/363; H04N 21/4415; G02F 1/13338; G02F 1/133528; G02F 1/13363; G06K 9/46; G06K 9/00
See application file for complete search history.

(56) References Cited

U.S. PATENT DOCUMENTS

| | | | | |
|---|---|---|---|---|
| 2017/0091568 A1* | 3/2017 | Hama | ........................ | G06T 7/13 |
| 2021/0083018 A1* | 3/2021 | Hu | ........................ | H01L 31/173 |

* cited by examiner

*Primary Examiner* — Nicholas G Giles
(74) *Attorney, Agent, or Firm* — Lin & Associates Intellectual Property, Inc.

(57) ABSTRACT

The invention relates to an image sensor, including a substrate, a unit pixel, a first polarizer, a second polarizer, and readout circuit. First, incident light is emitted to the image sensor, and the first and second polarizers convert incident light into first and second incident lights respectively. Then, the photoelectric conversion element of the unit pixel covered by the first and second polarizers respectively generates first and second electrons after receiving the first and second incident lights respectively. Afterwards, the readout circuit performs subtraction and integral of the first electron and the second electron to generate a voltage signal corresponding to the number of electrons in the actual signal. Finally, repeat the above steps. Thereby, the image sensor of the invention effectively increases the full well capacity of the equivalent unit pixel, so as to improve the signal-to-noise ratio of the image sensor of the invention.

24 Claims, 14 Drawing Sheets

US 11,303,840 B1

IMAGE SENSOR AND SENSING METHOD THEREOF WITH POLARIZERS FOR REMOVING BACKGROUND NOISE

CROSS-REFERENCE TO RELATED APPLICATION

This application claims the priority of Taiwanese patent application No. 109142107, filed on Nov. 30, 2020, which is incorporated herewith by reference.

BACKGROUND OF THE INVENTION

1. Field of the Invention

The present invention relates generally to an image sensor, and more particularly, to an image sensor for fingerprint sensing and sensing method thereof.

2. The Prior Arts

In recent years, thanks to the rapid development and promotion of the market in related technical fields, such as assisted driving, face recognition, virtual and augmented reality, the market for the complementary metal-oxide semiconductor (CMOS) image sensing is constantly expanding. In terms of current applications on the market, smart phones are still the largest terminal application market for CMOS image sensors.

However, with user demand for thinner and lighter smartphones, and the maturity of CMOS image sensor design and process technology, the volume of components that can be occupied by CMOS image sensors in smartphones is decreasing. For smaller-sized CMOS image sensors, because the conventional shallow trenches and ion implantation electrical isolation are restricted by the manufacturing process, the reduction of the component volume of the CMOS image sensor results in the fill factor decrease of the CMOS image sensor and the full well capacity decrease of the CMOS image sensor. Therefore, how to make the CMOS image sensor have a better signal-to-noise ratio is one of the problems that developers should solve.

In addition, when the CMOS image sensor is used in an optical fingerprint recognition environment, the fingerprint image is a pattern composed of many curved lines. The correctness of the fingerprint characteristics of the fingerprint image will affect the accuracy of the entire device. However, when the CMOS image sensor receives fingerprint images, the background light occupies an excessive percentage of the full well capacity compared to the actual signal. As a result, it will affect the identification of fingerprint characteristics in the fingerprint image, thereby affecting the accuracy of optical fingerprint recognition.

Therefore, after observing the above-mentioned deficiencies, the inventors came up with the present invention.

SUMMARY OF THE INVENTION

A primary objective of the present invention is to provide an image sensor, by a readout circuit computing and generating a first voltage signal and a second voltage signal based on the number of electrons generated by the photodiode covered by the first polarizer and the second polarizer, respectively, and then subtracting the first voltage signal from the second voltage signal to eliminate the sensed voltage signal from the background noise. Thereby the image sensor according to the present invention can increase the full well capacity of the equivalent unit pixel, and the image sensor according to the present invention has a better signal-to-noise ratio.

For achieving the foregoing objectives, the present invention provides an image sensor, which includes: a substrate; a plurality of unit pixels, arranged on the substrate, and each of the unit pixels comprising a photoelectric conversion element, for generating electrons after receiving an incident light; a plurality of first polarizers, arranged on a part of the unit pixels, and each of the first polarizers covering each unit pixel of the part of the unit pixels, the first polarizers being for changing the incident light into a first incident light having a first polarization direction, and the photoelectric conversion element receiving the first incident light and generating a plurality of first electrons; a plurality of second polarizers, arranged on another part of the unit pixels, and each of the second polarizers covering each unit pixel of the another part of the unit pixels, the second polarizers being for changing the incident light into a second incident light having a second polarization direction, and the photoelectric conversion element receiving the second incident light and generating a plurality of second electrons; and a plurality of readout circuits, coupled to the unit pixels, after the readout circuit performing subtraction and integral operations on the first electrons and the second electrons, the readout circuit generating a voltage signal; wherein the incident light comprising an actual signal and a background noise, the voltage signal generated by the readout circuit corresponding to the number of electrons in the actual signal.

Preferably, the image sensor according to the present invention is applied in the environment of optical fingerprint recognition.

Preferably, according to the image sensor of the present invention, the photoelectric conversion element is a pinned photo diode (PPD).

Preferably, according to the image sensor of the present invention, the unit pixels further comprise: a charge transfer element, coupled to the photoelectric conversion element, the charge transfer element transferring the electrons to the readout circuit; and a charge reset element, coupled to the charge transfer element, and the charge reset element being for resetting the electrons stored in the photoelectric conversion element.

Preferably, according to the image sensor of the present invention, the unit pixels further comprise: a source follower, coupled to the charge transfer element and the charge reset element, the source follower being for reducing the effect of parasitic capacitance.

Preferably, according to the image sensor of the present invention, the polarization direction of the incident light corresponding to the actual signal is the same as the first polarization direction, but the present invention is not limited to herein.

Preferably, according to the image sensor of the present invention, the angle between the polarization direction of the incident light corresponding to the actual signal and the first polarization direction is less than 45 degrees, but the present invention is not limited to herein.

Preferably, according to the image sensor of the present invention, the actual signal is not much larger than the background noise.

Preferably, according to the image sensor of the present invention, the first polarizer and the second polarizer are made of one of a birefringent material and a metal grating, but the present invention is not limited to herein.

Preferably, according to the image sensor of the present invention, the first polarization direction and the second polarization direction are orthogonal to each other, but the present invention is not limited herein.

Preferably, according to the image sensor of the present invention, the first incident light comprises a first background light, a first background noise corresponding to the number of electrons generated by the first background light, and a second incident light comprises a second background light, a second background noise corresponding to the amount of electrons generated by the second background light, the first background noise is the same or similar to the second background noise, and the polarization directions of the first background light and the second background light are different, but the invention is not limited to herein.

Preferably, according to the image sensor of the present invention, the readout circuit is a differential integrator.

Moreover, to achieve the foregoing objective, the present invention further provides a display device based on the foregoing image sensor, comprising: a display panel having a display area; and the foregoing image sensor disposed on the display panel, wherein the image sensor correspondingly overlaps the display area.

Preferably, according to the display device of the present invention, the display panel is a liquid crystal display panel, an organic electroluminescence display panel, an organic light-emitting diode display panel, or a micro light-emitting diode display panel, but the invention is not limited to herein.

Moreover, achieve the foregoing objective, the present invention, based on the aforementioned image sensor, further provides a sensing method for eliminating background noise, comprising: a polarization step, an incident light transmitted to an image sensor, a plurality of first polarizers converting the incident light into a first incident light, and a plurality of second polarizers converting the incident light into a second incident light; a conversion step, the photoelectric conversion element of the unit pixels covered by the first polarizer generating a first electron after receiving the first incident light, and the photoelectric conversion element of the unit pixels covered by the second polarizer generating a second electron after receiving the second incident light; an elimination step, a readout circuit performing subtraction and integral operations on the first electron and the second electron, and the readout circuit generating a voltage signal corresponding to the number of electrons; and repeating the above polarization step, conversion step, and elimination step for N times, wherein N is one of 0 and a positive integer to produce a better signal-to-noise ratio (SNR).

Preferably, the sensing method according to the present invention is applied in the environment of optical fingerprint recognition.

Preferably, according to the sensing method of the present invention, the photoelectric conversion element is a pinned photo diode (PPD).

Preferably, according to the sensing method of the present invention, the sensing method further comprises the following steps: a reset step, with a charge reset element coupled to a charge transfer element, the charge reset element resetting the electrons stored in the photoelectric conversion element; and a transfer step, with the charge transfer element coupled to the photoelectric conversion element, the charge transfer element transferring electrons to the readout circuit.

Preferably, according to the sensing method of the present invention, the unit pixels further comprise: a source follower (source follower), coupled to the charge transfer element and the charge reset element, the source follower being for reducing the effect of parasitic capacitance.

Preferably, according to the sensing method of the present invention, the polarization direction of the incident light corresponding to the actual signal is the same as the first polarization direction.

Preferably, according to the sensing method of the present invention, the angle between the polarization direction of the incident light corresponding to the actual signal and the first polarization direction is less than 45 degrees.

Preferably, according to the sensing method of the present invention, the actual signal is not much larger than the background noise.

Preferably, according to the sensing method of the present invention, the first polarizer and the second polarizer are made of one of a birefringent material and a metal grating, but the present invention is not limited to herein.

Preferably, according to the sensing method of the present invention, the first polarization direction and the second polarization direction are orthogonal to each other, but the present invention is not limited herein.

Preferably, according to the sensing method of the present invention, the first incident light comprises a first background light, a first background noise corresponding to the number of electrons generated by the first background light, and a second incident light comprises a second background light, a second background noise corresponding to the amount of electrons generated by the second background light, the first background noise is the same or similar to the second background noise, and the polarization directions of the first background light and the second background light are different, but the invention is not limited to herein.

Preferably, according to the sensing method of the present invention, the readout circuit is a differential integrator.

In summary, the image sensor and sensing method provided by the present invention mainly use the image sensor of the present invention in conjunction with a sensing method that eliminates background noise, thereby increasing the full well capacity of the equivalent unit pixel so that the image sensor according to the present invention can accommodate more effective electrons, thereby improving the signal-to-noise ratio of the image sensor according to the present invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
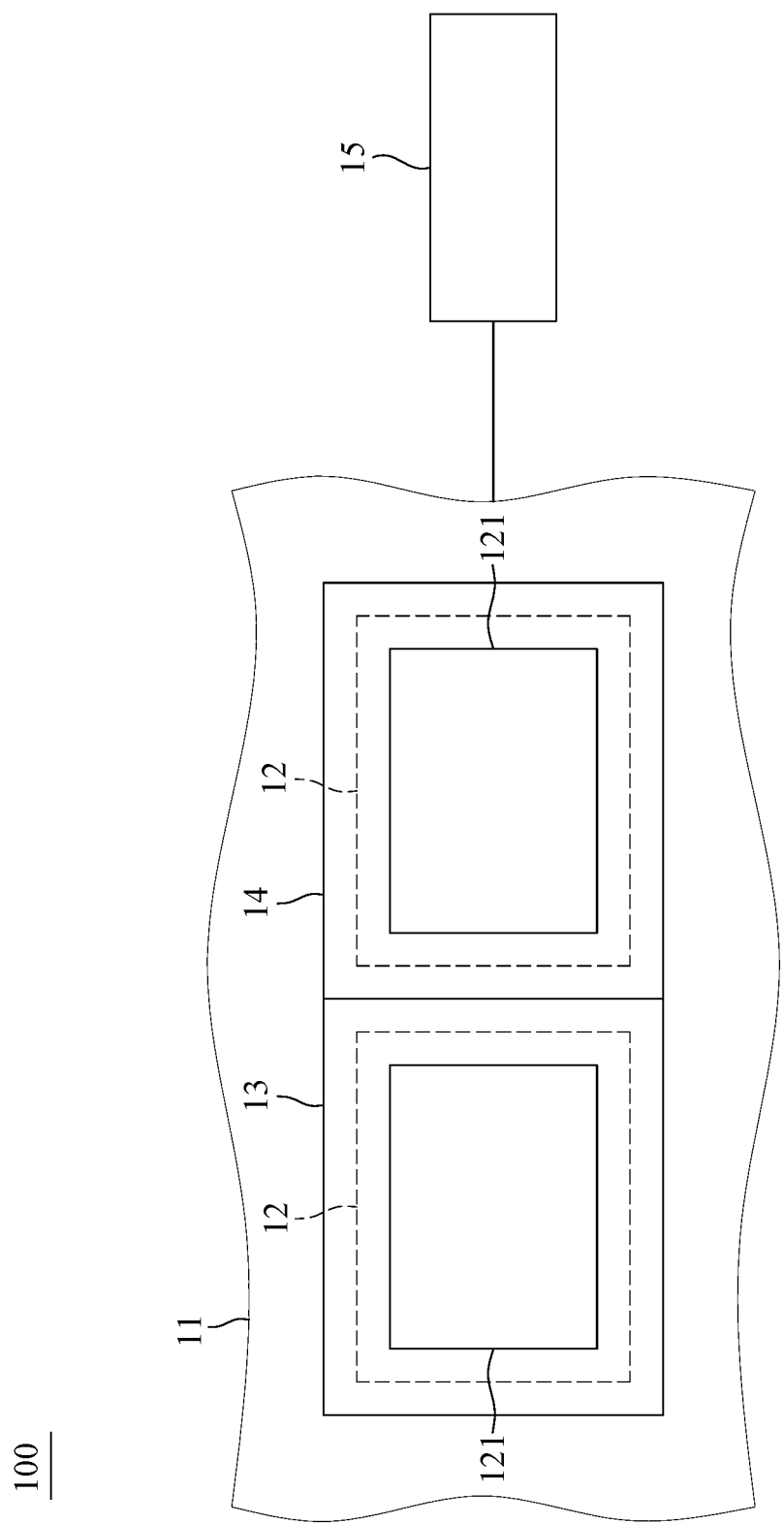
FIG. 1 is a schematic view of an image sensor according to the present invention.

FIG. 1 is a schematic view of an image sensor according to the present invention. As shown in FIG. 1, the image sensor 100 according to the present invention includes: a substrate 11, a plurality of unit pixels 12, a plurality of first polarizers 13, a plurality of second polarizers 14, and a plurality of readout circuits 15.

Specifically, the image sensor 100 according to the present invention can be applied to fingerprint recognition and face recognition. In addition, the image sensor 100 according to the present invention can be a back-illuminated CMOS image sensor or front-illuminated CMOS image sensor, but the invention is not limited to herein.

Specifically, referring to FIG. 1, the unit pixels 12 are disposed on the substrate 11, and each of the unit pixels 12 includes at least one photoelectric conversion element 121, wherein the photoelectric conversion element 121 receives an incident light R to generate electrons, and the photoelectric conversion element 121 also has the ability to accumulate the aforementioned electrons, but the present invention is not limited to herein.

Specifically, the photoelectric conversion element 121 may be an element that generates and accumulates electrons corresponding to the incident light R. For example, the photoelectric conversion element 121 may be selected from one or a combination of photodiodes, photo transistors, photo gates, pinned photo diodes (PPD). It should be further noted that the charge storage capacity of the photoelectric conversion element 121 has its own limit, which causes the unit pixel 12 to have a full well capacity (FWC) limit.

Specifically, the unit pixel 12 may have a structure with one transistor. In some embodiments, the unit pixel 12 may have a structure with three transistors. For example, the unit pixel 12 may form a 3T-APS (3 transistor-Active Pixel Sensor) structure, or other suitable transistor structures may also be used. For example, in some embodiments, the unit pixel 12 may have a structure with four transistors, such as, a 4T-APS (4 transistor-Active Pixel Sensor) structure. However, the present invention is not limited to herein.

Specifically, referring to FIG. 1, the first polarizer 13 is disposed on a part of the unit pixels, and each of the plurality of first polarizers 13 covers a part of the unit pixels 12. The first polarizer 13 is used to change the incident light R into a first incident light $R_1$ with the first polarization direction (not shown), and the photoelectric conversion element 121 receives the first incident light $R_1$ and then generates the first electron (not shown).

Specifically, referring to FIG. 1, the second polarizer 14 is disposed on another part of the unit pixels, and each of the plurality of second polarizers 14 covers the other part of the unit pixels 12. The second polarizer is used to change the incident lights R into a second incident light $R_2$ having a second polarization direction (not shown), and the photoelectric conversion element 121 receives the second incident light $R_2$ and then generates a second electron (not shown).

Specifically, in a preferred embodiment of the present invention, the first polarization direction and the second polarization direction are orthogonal to each other, and the first polarizer 13 and the second polarizer 14 may be made of one of birefringent material and metal grating, but the invention is not limited to herein.

Specifically, the readout circuit 15 is coupled to the unit pixels 12. After the readout circuit 15 performs subtraction and integral operations on the first electron and the second electron, the readout circuit 15 generate a voltage signal corresponding to the number of electrons (not shown).

Figure 2:
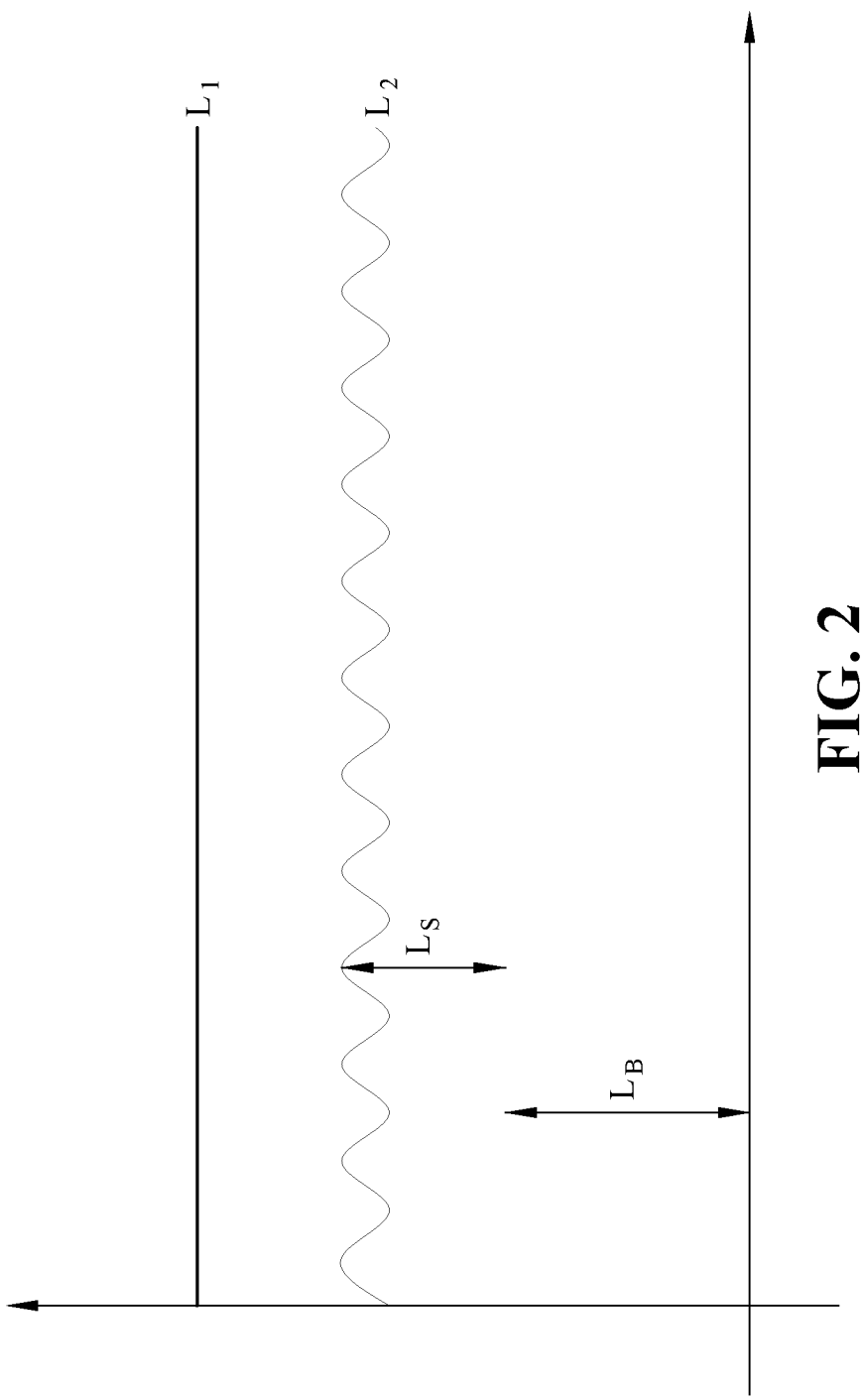
FIG. 2 is a schematic view illustrating the full well capacity of a unit pixel according to the present invention.

Refer to FIG. 2, which is a schematic view illustrating the full well capacity of the unit pixel according to the present invention. As shown in FIG. 2, $L_1$ represents the limit of the full well capacity (FWC) of the photoelectric conversion element 121, and $L_2$ represents the number of first electrons (not shown) generated after the photoelectric conversion element 121 receiving the first incident light $R_1$ with the first polarization direction. The incident light R includes the actual signal Rs and the background light $R_B$, and the actual signal $R_s$ has a certain degree of polarization. The polarization direction of the actual signal $R_s$ is the same as the polarization direction of the first polarizer or forming an angle less than 45 degrees. In addition, the background light $R_B$ is unpolarized. Specifically, $L_2$ includes the number of electrons $L_s$ generated by the actual signal $R_s$ and the number of electrons $L_B$ generated by the background light $R_B$, wherein $L_s$ represents the number of electrons generated by the photoelectric conversion element 121 corresponding to the actual signal $R_s$. and $L_B$ represents the number of electrons that the photoelectric conversion element 121 generates corresponding to the background light $R_B$ and the electrons contributed by dark current. At this time point, when the actual signal $R_s$ is not much larger than the background light $R_B$, the full well capacity of the unit pixel 12 is easily saturated due to the background light $R_B$, and the image sensor is unable to obtain a better signal-to-noise ratio.

It is worth noting that in the present implementation, the referred fingerprint recognition application means that the fingerprint signal is not much larger than the background, but the present invention is not limited to herein.

Thereby, the image sensor 100 according to the present invention covers a part of the unit pixels 12 by the first polarizer 13 and covers another part of the unit pixels 12 by the second polarizer 14, so as to respectively perform integral operation of the accumulated and stored electrons per unit time, wherein the first electrons stored in the part of the unit pixels 12 covered by the first polarizer 13 are integrated into the first electron quantity (not shown), the electrons stored in the unit pixels 12 in the other part covered by the second polarizer 14 are integrated into the second electron quantity (not shown).

It should be further explained that the first incident light $R_1$ includes a first background light (not shown), and the second incident light $R_2$ includes a second background light (not shown), wherein the number of first electron quantity includes the first background noise (not shown) caused by the first background light, and the second electron quantity includes the second background noise (not shown) caused by the second background light, wherein the first background noise is the same as or similar to the second background noise, and the polarization directions of the first background light and the second background light are different. It should be noted that the first incident light $R_1$ includes the actual signal $R_s$ substantially because it has the polarization the same as the first polarizer or forming an angle less than 45 degrees. Therefore, the readout circuit 15 can perform the subtraction between the first electron quantity and the second electron quantity. The subtraction operation eliminates the amount of electrons stored and accumulated in the unit pixel 12 caused by the background light $R_B$ and dark current. The voltage signal generated by the readout circuit 15 corresponds to the actual signal $R_s$ and does not include background noise.

It is worth noting that in the application of under display optical fingerprint recognition, the background noise eliminated according to the present invention can include moire patterns and OLED panel patterns, but the present invention does not Limited to herein.

Figure 3:
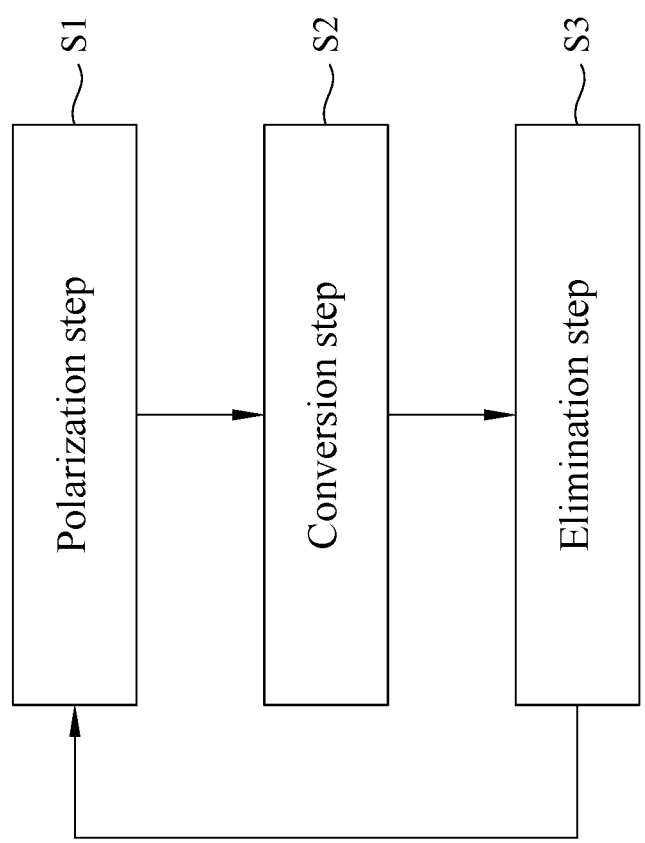
FIG. 3 is a flowchart illustrating the steps of implementing the sensing method of the present invention.

Refer to FIG. 3, which is a flowchart illustrating the steps of performing the sensing method of the present invention. As shown in FIG. 3, the present invention further provides a sensing method, which can be applied to the foregoing image sensor 100, and the sensing method includes the following steps:

In the polarization step S1, the incident light R is emitted to the image sensor 100, the first polarizer 13 converts the incident light R into the first incident light R1, and the second polarizer 14 converts the incident light R into the second incident light R2, then conversion step S2 is executed.

In the conversion step S2, the photoelectric conversion element 121 of the unit pixel 12 covered by the first polarizer 13 generates the first electrons after receiving the first incident light $R_1$. The photoelectric conversion element 121 of the unit pixel 12 covered by the second polarizer 14 generates the second electrons after receiving the second incident light $R_2$, and then elimination step S3 is executed.

In elimination step S3, after the readout circuit 15 performs subtraction and integral operations on the first electrons and the second electrons, the readout circuit 15 generates a voltage signal corresponding to the number of electrons.

Finally, repeat the above steps, the method and principle are the same as those described above, and the description will not be repeated here. It is worth noting that by repeating the above steps, the actual signal $R_s$ can be continuously integrated but the background noise is not integrated. In addition, the sensing method of the present invention can also perform the polarization step S1, the conversion step S2, and the elimination step S3 only once, but the present invention is not limited to herein.

As such, based on the image sensor 100 according to the present invention, combined with the sensing method provided by the present invention, the present invention can successfully eliminate the electrons generated by the background light $R_B$ and the dark current generated by the thermal energy in the environment to achieve the effect of equivalently increasing the full well capacity of the unit pixel 12 without changing the size of the full well capacity, so that the image sensor 100 according to the present invention can accommodate more effective electrons, thereby improving the signal-to-noise ratio of the image sensor 100 of the present invention.

First Embodiment

The following, with reference to the related figures, describes the implementation of the first embodiment.

Figure 4:
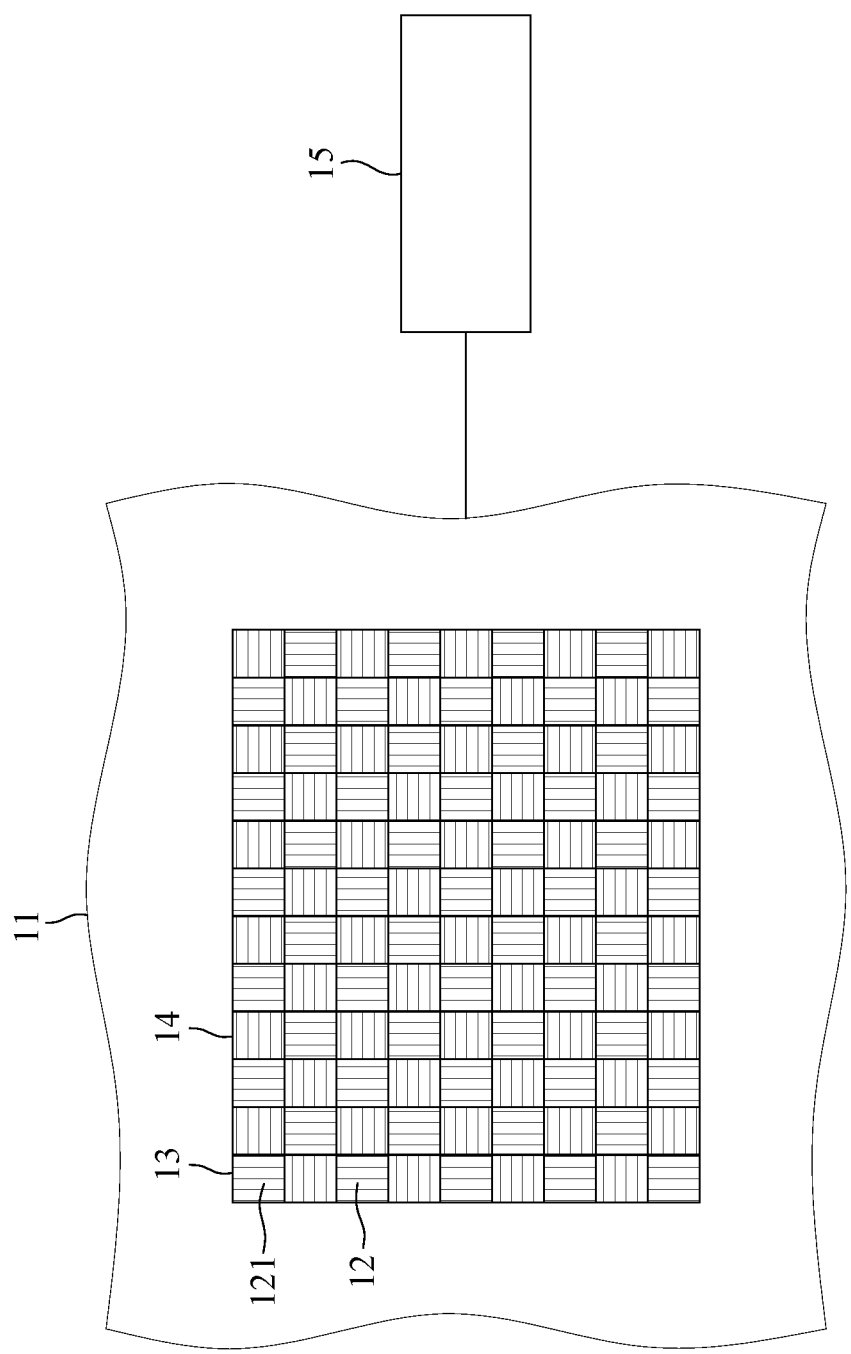
FIG. 4 is a schematic view of a system of an image sensor according to the first embodiment of the present invention.

Refer to FIG. 4, which is a schematic system view of the image sensor according to the first embodiment of the present invention. As shown in FIG. 4, the image sensor 100 according to the first embodiment of the present invention is applied to a fingerprint sensing system. The image sensor 100 includes: a substrate 11, a plurality of unit pixels 12, a plurality of first polarizers 13, a plurality of second polarizers 14 and a plurality of readout circuit 15.

Figure 5:
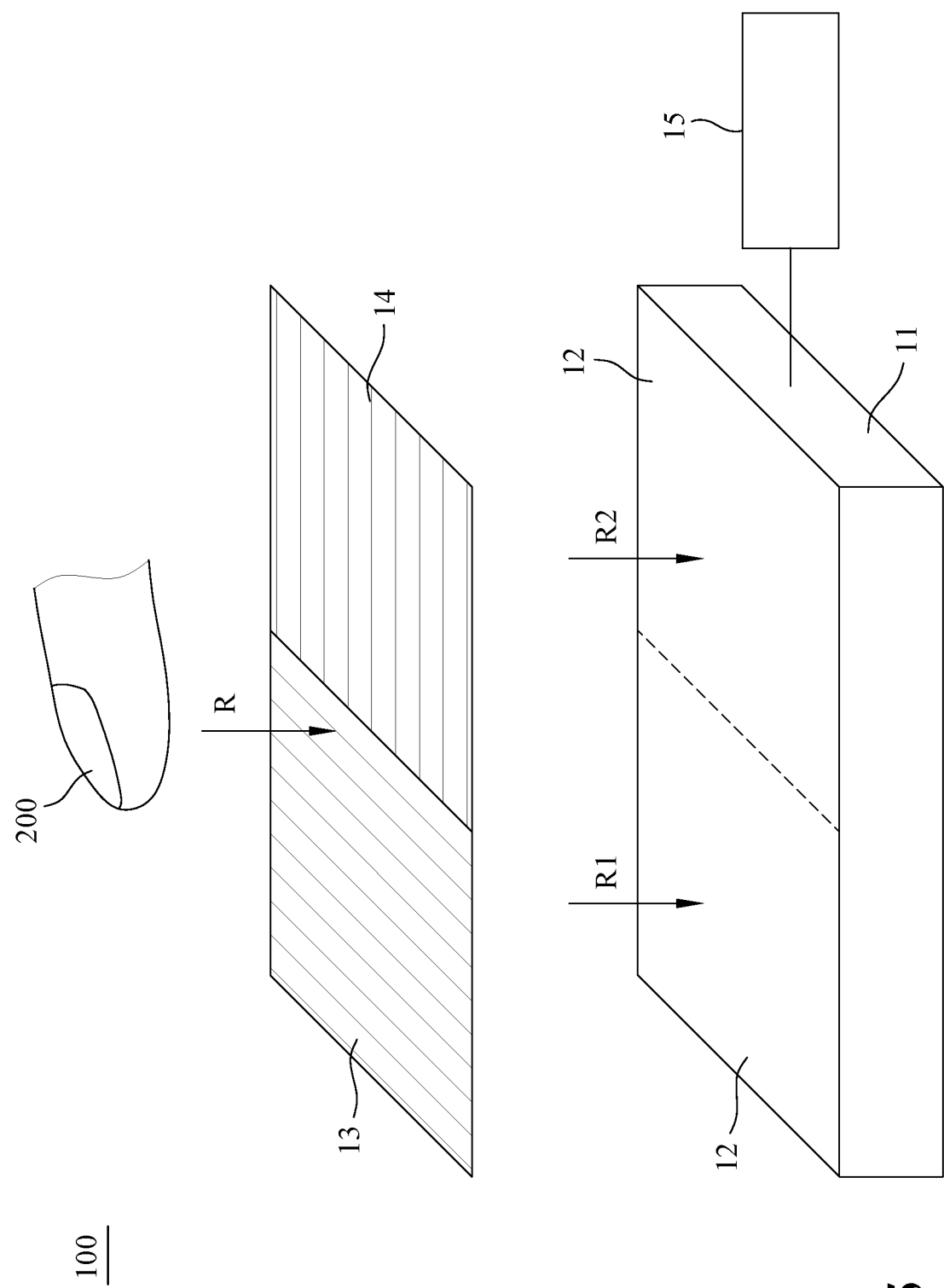
FIG. 5 is a schematic view illustrating the position of the image sensor according to the first embodiment of the invention.

Specifically, refer to FIG. 5, which is a schematic view illustrating the position of the image sensor according to the first embodiment of the present invention. As shown in FIG. 5, the first polarizer 13 is disposed on a part of the unit pixels. Each of the first polarizers covers at least one of the unit pixels. When a fingerprint image 200 generates a plurality of incident lights R, the first polarizer is used to turn the incident lights R into the first incident lights $R_1$ with the first polarization direction (not shown). It should be further explained that, in the present embodiment, the first polarization direction is set as the polarization direction of the fingerprint image 200, but the present invention is not limited to herein.

Specifically, as shown in FIG. 4, the second polarizer 14 is disposed on another part of the unit pixels, and each of the second polarizers 14 covers at least one of the unit pixels, When the fingerprint image 200 generates a plurality of incident lights R, the second polarizer is used to turn the incident lights R into second incident lights $R_2$ with a second polarization direction (not shown).

It should be further explained that, in the present embodiment, the first polarization direction and the second polarization direction are orthogonal to each other, but the user can choose the first polarization direction and the second polarization direction arbitrarily according to the requirements of the system used, but the present invention is not limited to herein.

It should be further explained that, in the present embodiment, the first polarization direction and the second polarization direction may also be left-turn and right-turn polarization directions orthogonal to each other, but the present invention is not limited to herein.

Figure 6:
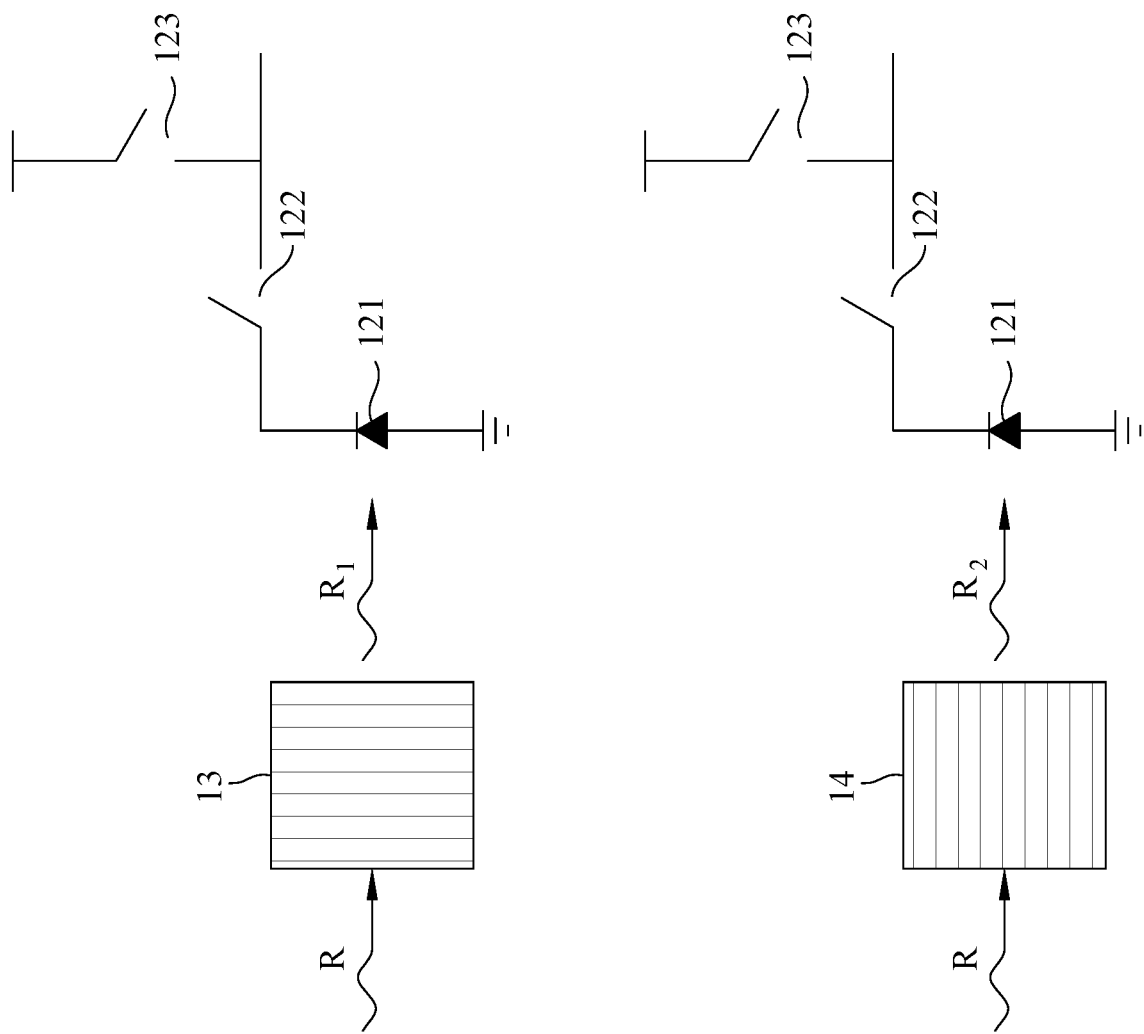
FIG. 6 is a schematic view illustrating the structure of the image sensor according to the first embodiment of the present invention.

Specifically, refer to FIG. 6, which is a schematic view illustrating the structure of the image sensor according to the first embodiment of the present invention. In the present embodiment, the unit pixel 12 further includes a charge transfer element 122 and a charge reset element 123, wherein the charge transfer element 122 is coupled to the photoelectric conversion element 121, the charge transfer element 122 transfers electrons to the readout circuit 15; the charge reset element 123 is coupled to the charge transfer element 122, and is used to reset the charge stored in the photoelectric conversion element 121.

It should be further explained that the calculation method of the effective electrons accumulated by the image sensor 100 according to the present invention is shown in the following formula: referring to formula (1), pixel_1 represents the first electrons generated by the photoelectric conversion element 121 of the unit pixels 12 covered by the first polarizer 13 after receiving the first incident light $R_1$, wherein 100% SIG means that the photoelectric conversion element 121 of the unit pixel 12 covered by the first polarizer 13 can generate 100% electrons of the fingerprint image 200 because the first polarization direction is the same as the polarization direction of the fingerprint image 200, and 50% BGL means that the photoelectric conversion element 121 of the unit pixel 12 covered by the first polarizer 13 can only generate 50% electrons of the background light $R_B$ because the background light $R_B$ can have any polarization direction. Referring to formula (2), pixel_2 represents the second electrons generated by the photoelectric conversion element 121 of the unit pixels 12 covered by the second polarizer 14 after receiving the second incident light $R_2$. wherein 0% SIG means that the photoelectric conversion element 121 of the unit pixel 12 covered by the second polarizer 14 does not receive any fingerprint image 200 because the first polarization direction is the same as the polarization direction of the fingerprint image 200 and the first polarization direction and the second polarization direction are orthogonal to each other, and 50% BGL means that the photoelectric conversion element 121 of the unit pixel 12 covered by the second polarizer 14 can generate another 50% electrons of the background light $R_B$ because the background light $R_B$ can have any polarization direction. Referring to formula (3), it can be understood that the readout circuit according to the present invention can combine formula (1) with formula (2), and the user can obtain 100% of the electrons generated by the fingerprint image 200, but the invention is not limited to herein.

Pixel_1=100% *SIG*+50% *BGL*  formula (1)

Pixel_2=0% *SIG*+50% *BGL*  formula (2)

Pixel_1−Pixel_2=100% *SIG*  formula (3)

Figure 7:
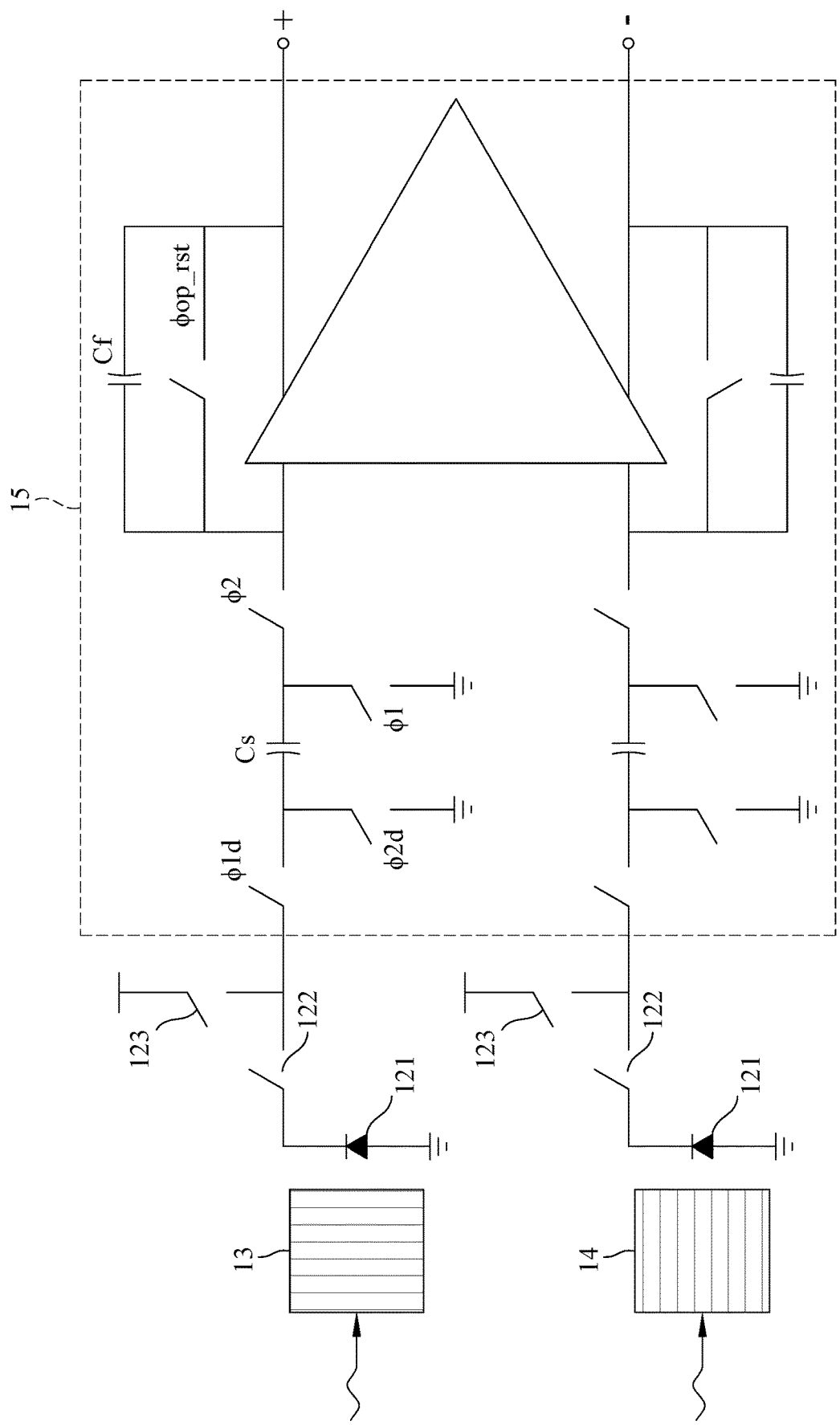
FIG. 7 is a schematic circuit block diagram of the image sensor according to the first embodiment of the present invention.

Refer to FIG. 7, which is a schematic circuit block diagram of the image sensor according to the first embodiment of the present invention. As shown in FIG. 7, the circuit $\phi_1$ and circuit $\phi_{1d}$ inside the readout circuit 15 are to store the first charges generated by the photoelectric conversion element 121 of the unit pixel 12 covered by the first polarizer 13 and second charges generated by the photoelectric conversion element 121 of the unit pixel 12 covered by the second polarizer 14 respectively in the capacitor $C_s$ inside the readout circuit 15. The circuit $\phi_2$ and the circuit $\phi_{2d}$ inside the readout circuit 15 transfer the first charge and the second charge to the capacitor $C_f$, causes the readout circuit 15 to perform a subtraction operation. The control timing of the circuit $\phi_{1d}$ is the delay of the control timing of the circuit $\phi_1$, the control timing of the circuit $\phi_{2d}$ is the delay of the control timing of the circuit $\phi_2$, and the circuit $\phi_{op\_rst}$ inside the readout circuit 15 is used as an operational amplifier to reset the readout circuit 15. Thereby, the readout circuit 15 can generate a voltage signal corresponding to the actual signal, and successfully eliminate the electrons generated by the background light $R_B$ and the dark current generated by the thermal energy in the environment. In addition, by repeating the above operations, the voltage signal can be continuously integrated, which is equivalent to perform the integral operation on the actual signal. As such, the full well capacity of the equivalent unit pixel 12 can be improved without changing the size of the full well capacity, but the present invention is not limited to herein.

Figure 8:
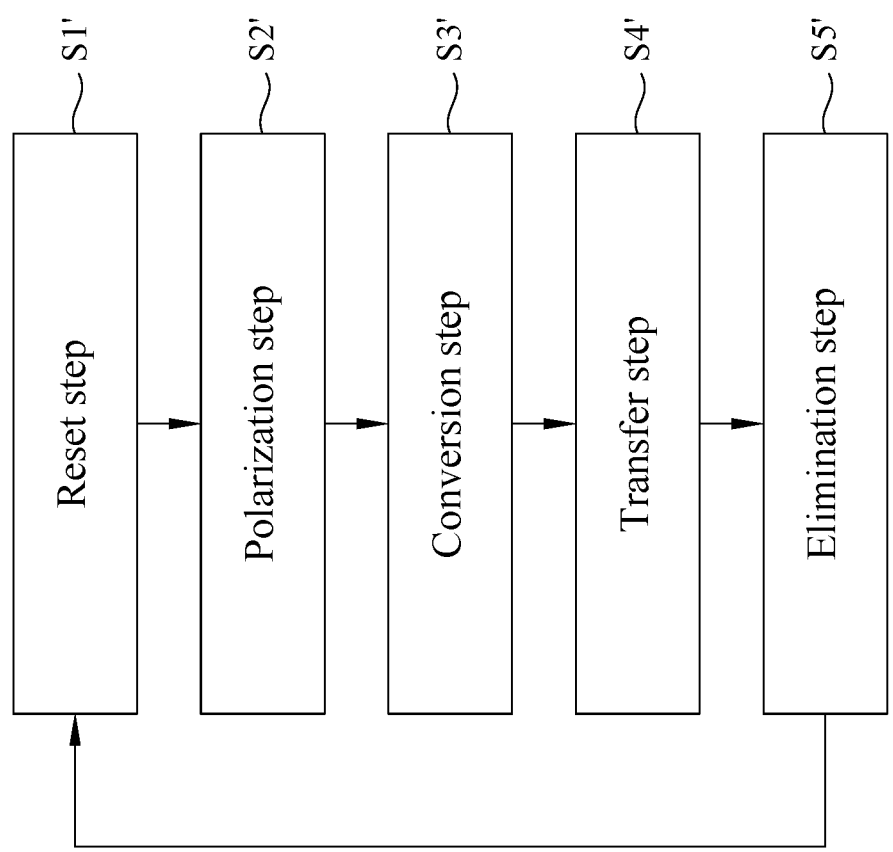
FIG. 8 is a flowchart illustrating the steps of performing the sensing method according to the first embodiment of the present invention.

Refer to FIG. 8, which is a flowchart illustrating the steps of performing the sensing method according to the first embodiment of the present invention. As shown in FIG. 8, the present invention further provides a sensing method, which can be applied to the image sensor 100, and the image sensing method includes the following steps:

In the reset step S1', the charge reset element 123 coupled to the charge transfer element 122 resets the electrons stored in the photoelectric conversion element 121, and then performs the polarization step S2'.

In the polarization step S2', the incident light R is emitted to the image sensor 100, the first polarizer 13 converts the incident light R into the first incident light $R_1$, and the second polarizer 14 converts the incident light R into the second incident light $R_2$, and then proceed to conversion step S3'.

In the conversion step S3', the photoelectric conversion element 121 of the unit pixel 12 covered by the first polarizer 13 generates the first electrons after receiving the first incident light $R_1$, and the photoelectric conversion element 121 of the unit pixel 12 covered by the second polarizer 14 generates the second electrons after receiving the second incident light $R_2$, and then proceed to the transfer step S4'.

In the transfer step S4', the charge transfer element 122 coupled to the photoelectric conversion element 121 transfers the photoelectrons to the readout circuit 15, and then proceed to the elimination step S5'.

In the elimination step S5', after the readout circuit 15 performs subtraction and integral operations on the first electron and the second electron, the readout circuit 15 generates a voltage signal corresponding to the number of electrons.

Finally, repeat the above steps, the method and principle are the same as those described above, and the description will not be repeated here.

Figure 9:
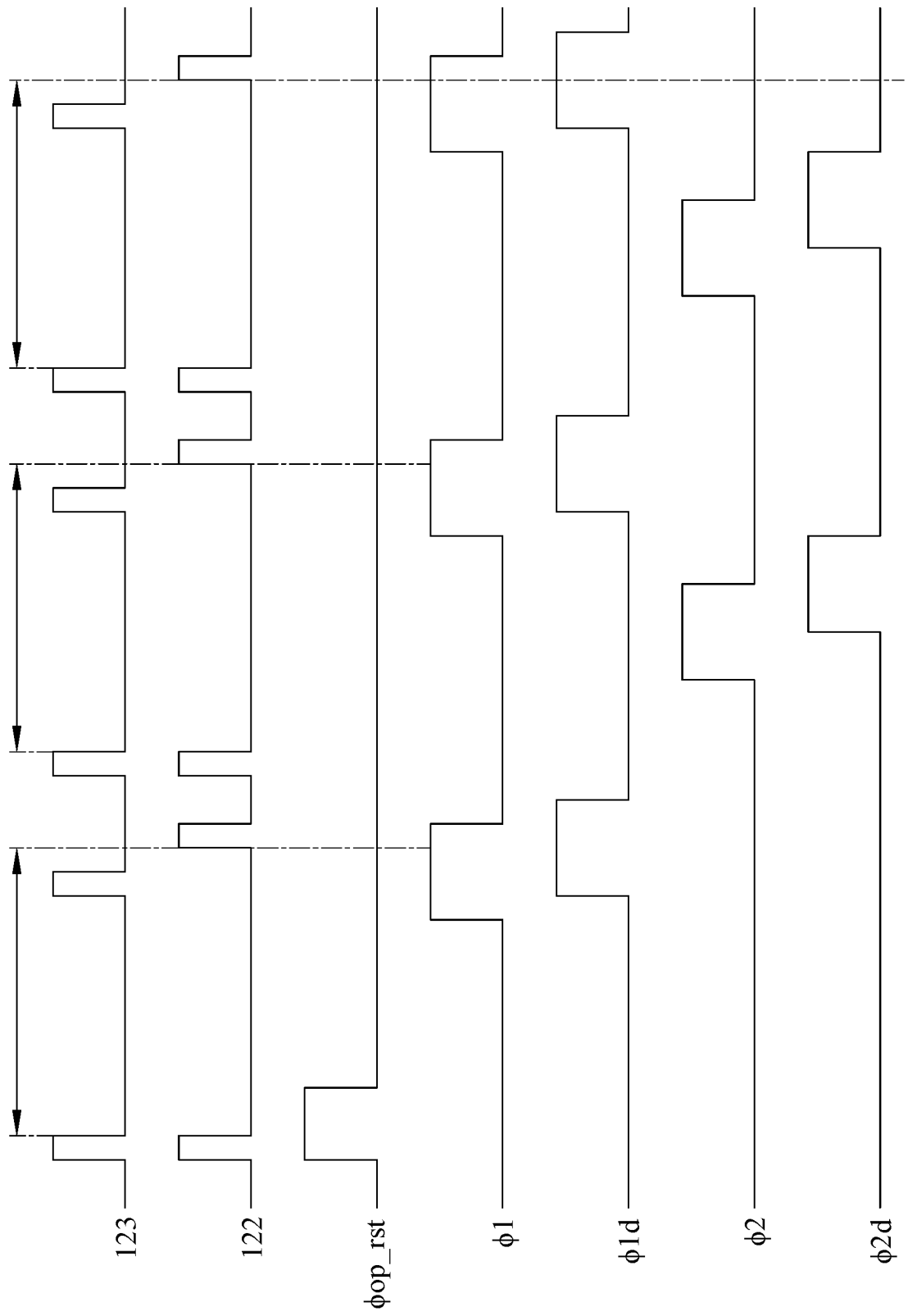
FIG. 9 is a timing diagram illustrating the sensing method of the image sensor according to the first embodiment of the present invention.

For example, referring to FIG. 9 in conjunction with FIGS. 4-8, FIG. 9 is a timing diagram illustrating the sensing method of the image sensor according to the first embodiment of the present invention. As shown in FIG. 9, first, the incident light R is emitted to the image sensor 100, and the charge transfer element 122, the charge reset element 123, and the circuit $\phi_{op\_rst}$ are activated to reset the photoelectric conversion element 121 and the readout circuit 15; then, the photoelectric conversion element 121 in the unit pixel 12 receives incident light R and generates electrons, wherein the photoelectric conversion element 121 of the unit pixel 12 covered by the first polarizers 13 generates the first electrons after receiving the first incident light $R_1$ and the photoelectric conversion element 121 of the unit pixel 12 covered by the second polarizers 14 generates the second electrons after receiving the second incident light $R_2$; then, the charge transfer element 122 coupled to the photoelectric conversion element 121 is activated to transfer the electrons to the readout circuit 15; at the same time, the circuit $\phi_{op\_rst}$ is activated to reset the electrons stored in the readout circuit 15; after that, the circuit $\phi_1$ and the circuit $\phi_{1d}$ are activated one by one to transfer the first electrons generated by the photoelectric conversion element 121 of the unit pixel 12 covered by the first polarizer 13 and the second electrons generated by the photoelectric conversion element 121 of the unit pixel 12 covered by the second polarizer 14 respectively to the capacitor $C_s$; then, the circuit $\phi_2$ and the circuit $\phi_{2d}$ are activated one by one to transfer the first electron and the second electron to the capacitor $C_f$, so that the arithmetic unit 15 performs a subtraction operation; thereby, the image sensor 100 according to the present invention stores 100% of the electrons generated by the fingerprint image 200, but the invention is not limited to herein. Finally, the above steps are repeated to perform the integral operation, so that the image sensor 100 according to the present invention repeatedly receives the incident light R, but the present invention is not limited to herein.

As such, based on the image sensor 100 of the first embodiment of the present invention, combined with the sensing method provided by the present invention, the present invention can successfully eliminate the electrons generated by the background light $R_B$ and the dark current caused by the heat in the environment to achieve the effect of increasing the full well capacity of the equivalent unit pixel 12 without changing the size of the full well capacity, so that the image sensor 100 according to the first embodiment of the present invention can accommodate more effective electrons to improve the signal-to-noise ratio of the image sensor 100 of the present invention.

Other examples of the image sensor 100 are provided below, so that a person with ordinary knowledge in the technical field of the present invention can understand possible variations more clearly. The elements indicated by the same element symbols as in the above embodiment are substantially the same as those described above with reference to FIG. 6. The components, features, and advantages that are the same as the image sensor 100 will not be repeated.

Figure 10:
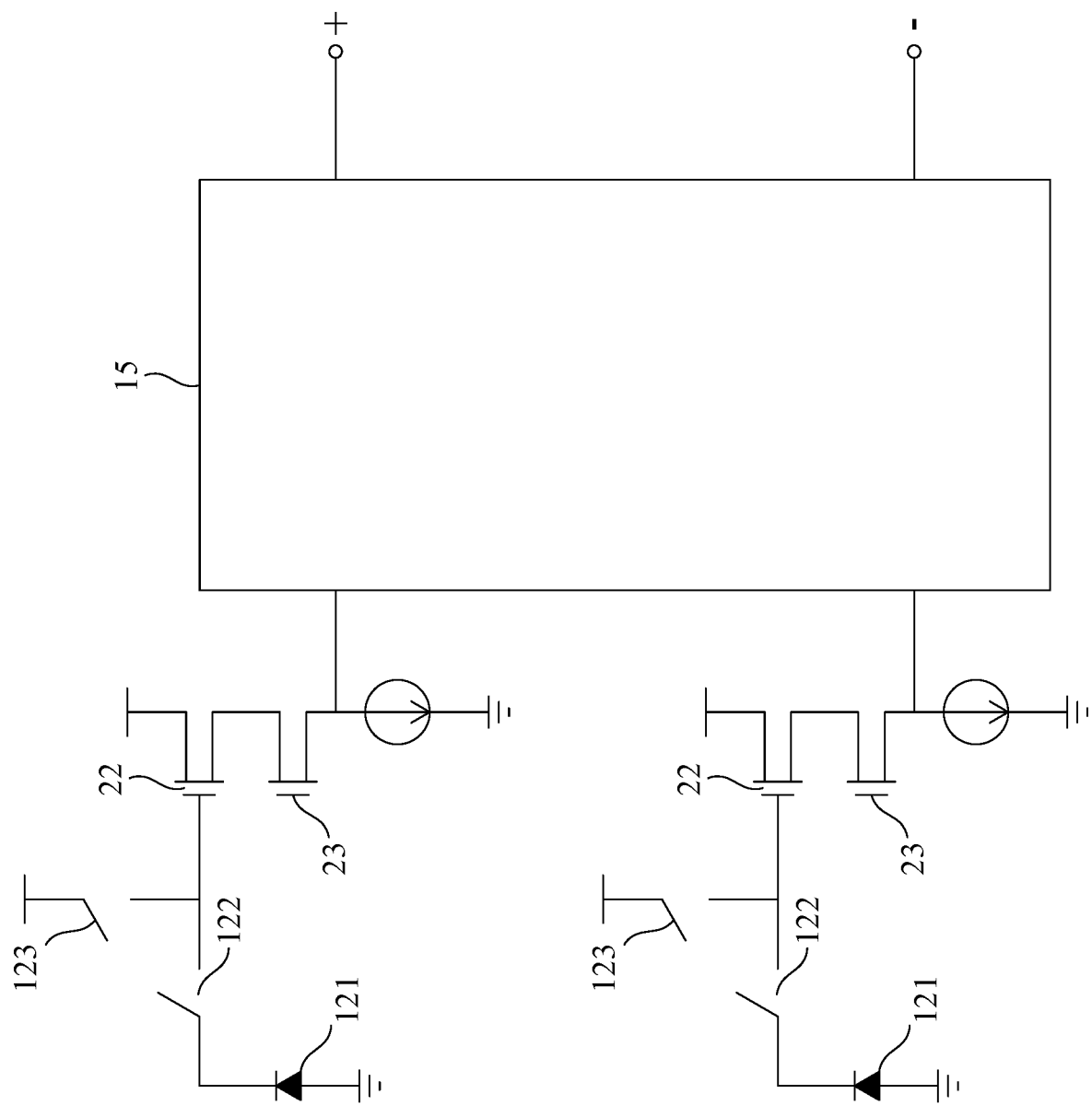
FIG. 10 is a schematic view illustrating an image sensor according to a second embodiment of the invention.

Refer to FIG. 10, which is an illustration of the image sensor 100 according to the second embodiment of the present invention. Compared with the first embodiment, the main structural difference of the second embodiment is that in the image sensor 100 of the second embodiment, the unit pixel 12 can have a structure with four transistors, that is, the unit pixel 12 is provided with a charge reset device 123, a charge transfer device 122, a source follower 22 and a select gate 23. The source follower can reduce the effect of parasitic capacitance. The materials and other characteristics of the unit pixel 12 according to the second embodiment of the present invention are similar to those of the unit pixel 12 according to the first embodiment of the present invention, and will not be repeated here.

Figure 11:
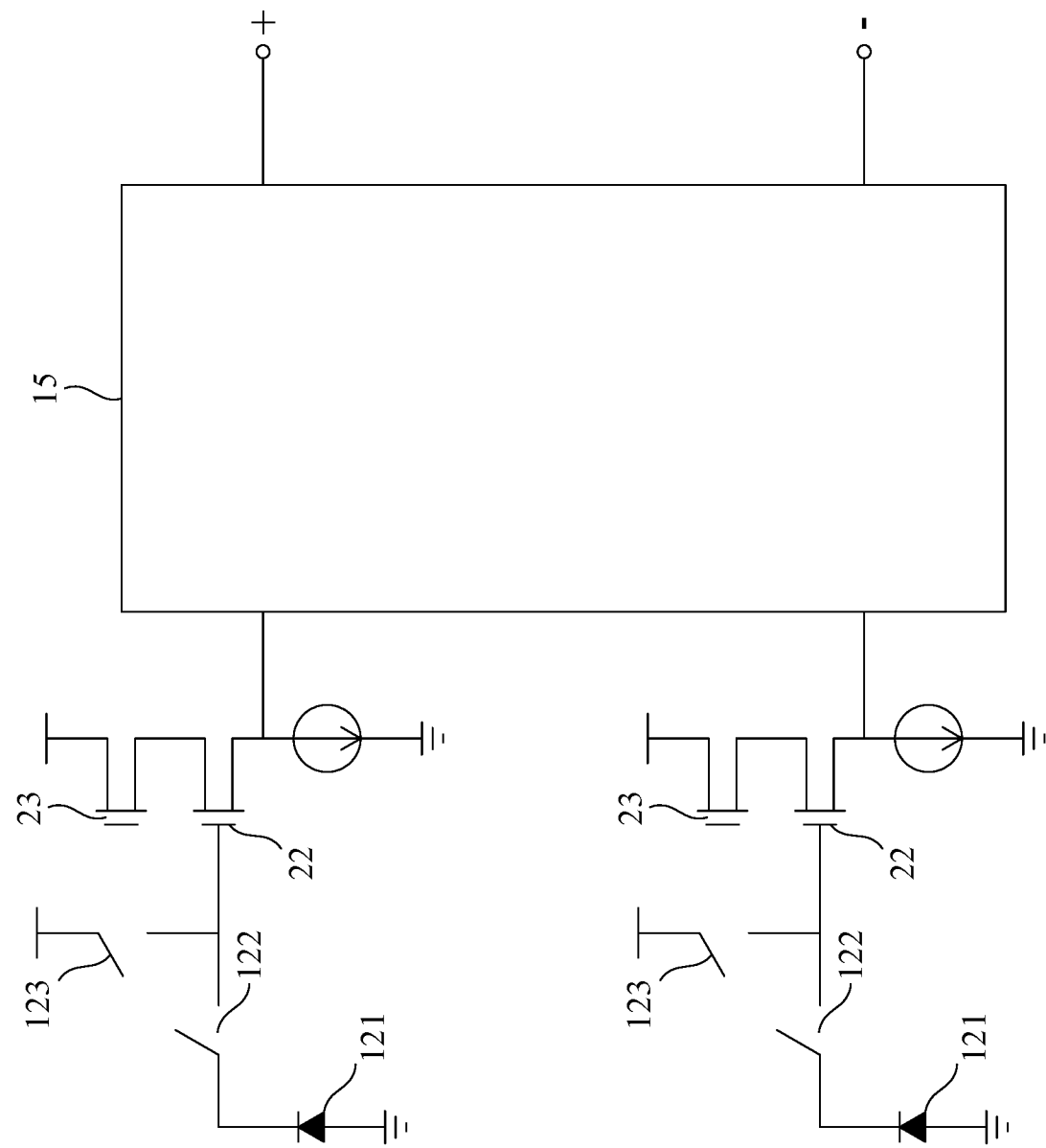
FIG. 11 is a schematic view illustrating an image sensor according to a third embodiment of the invention.

Refer to FIG. 11, which is an illustration of the image sensor 100 according to the third embodiment of the present invention. Compared with the second embodiment, the main structural difference of the third embodiment is that the position of the select gate 23 is different. In the image sensor 100 of the third embodiment, the unit pixel 12 has a structure of four transistors, and the structural principle is similar to the unit pixel 12 according to the second embodiment of the present invention, and the materials and other characteristics of the unit pixel 12 in the third embodiment are similar to those of the unit pixel 12 according to the first embodiment of the present invention, and will not be repeated here.

Figure 12:
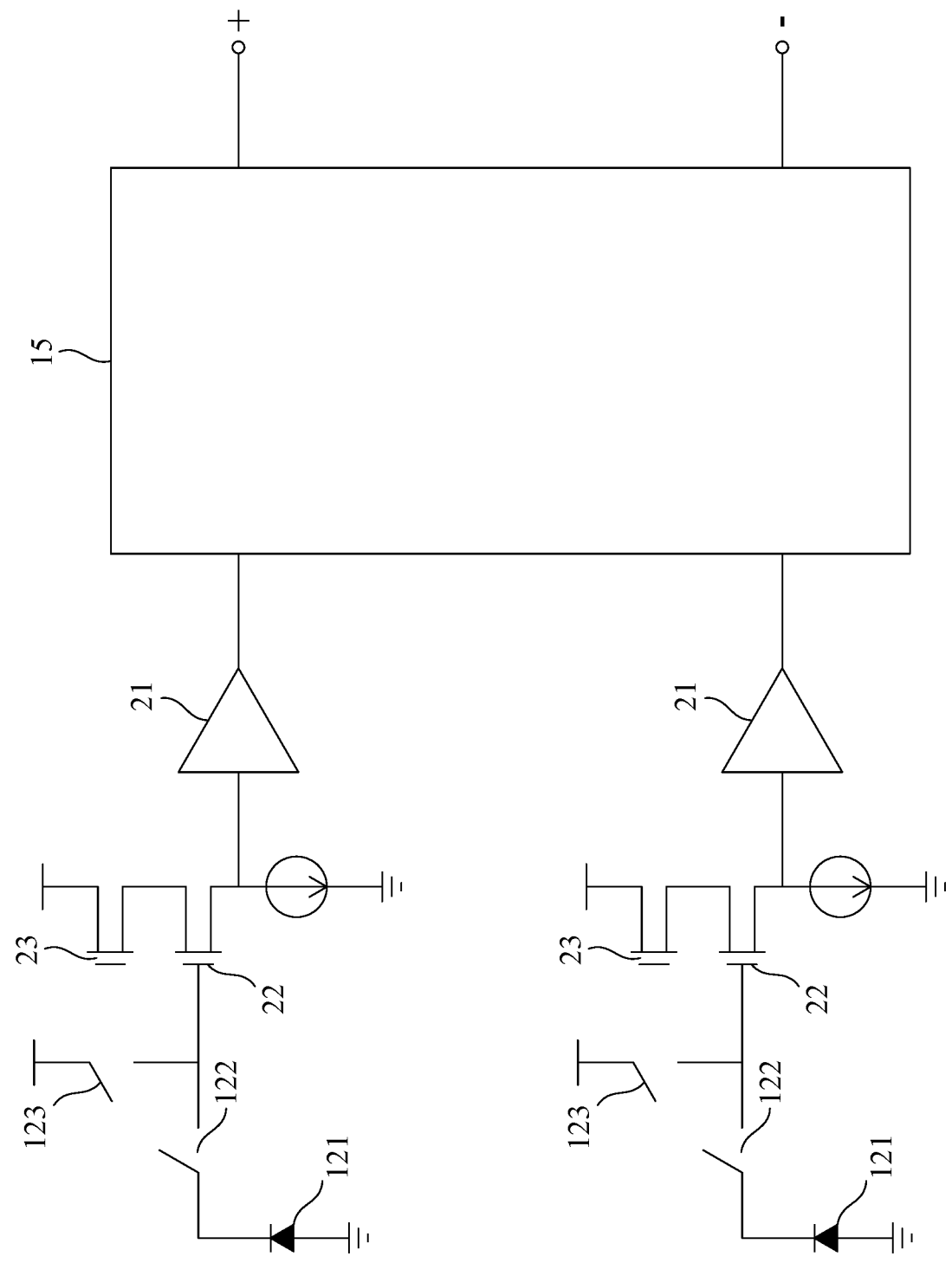
FIG. 12 is a schematic view illustrating an image sensor according to a fourth embodiment of the invention.

Refer to FIG. 12, which illustrates an image sensor 100 according to a fourth embodiment of the present invention. Compared with the third embodiment, the main structural difference of the fourth embodiment is that the image sensor 100 of the fourth embodiment further includes a gain amplifier 21. The gain amplifier 21 receives and amplifies the signal of the unit pixel 12, so that the signal-to-noise ratio can be further improved. The materials and other characteristics of the unit pixel 12 in the fourth embodiment are similar to those of the unit pixel 12 according to the first embodiment of the present invention, and will not be repeated here.

Figure 13:
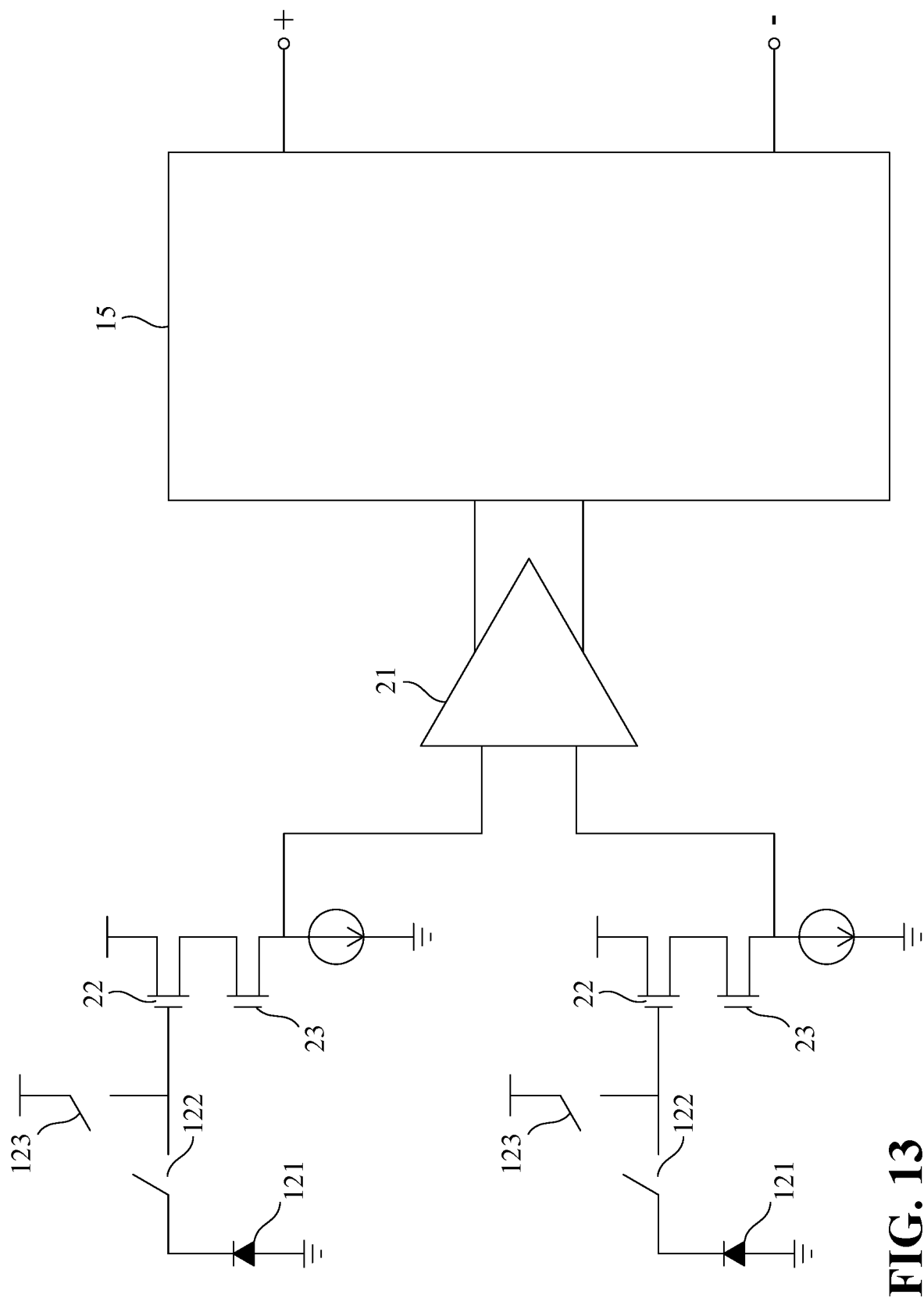
FIG. 13 is a schematic view illustrating an image sensor according to a fifth embodiment of the invention.

Refer to FIG. 13, which is an illustration of the image sensor 100 according to the fifth embodiment of the present invention. Compared with the fourth embodiment, the main structural difference of the fifth embodiment is that in the image sensor 100 of the fifth embodiment, the gain amplifier 21 is of a differential type, which has a better capability to suppress noise from the power supply. The materials and other characteristics of the unit pixel 12 in the fifth embodiment are similar to those of the unit pixel 12 according to the first embodiment of the present invention, and will not be repeated here.

It should be understood that a person with ordinary knowledge in the technical field of the present invention can make various modifications and adjustments based on the above examples, which will not be listed here.

The following embodiment shows the image sensor according to the present invention applied to a display device.

Figure 14:
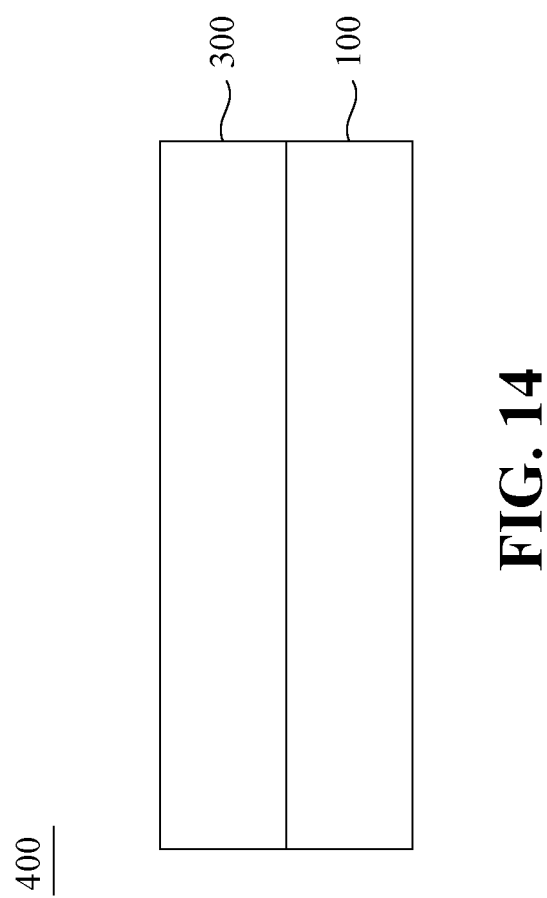
FIG. 14 is a schematic view illustrating the structure of a display device according to a preferred embodiment of the present invention.

Refer to FIG. 14, which is a schematic structural view of a display device according to a preferred embodiment of the present invention. The display device 400 includes a display panel 300 and an image sensor 100. The display panel 400 has a display area. The image sensor device 100 is disposed on the display panel 300. The image sensor device 100 correspondingly overlaps the display area. Specifically, the display panel 300 may be, but not limited to, a liquid crystal display panel (LCD), an organic electroluminescence display panel, an organic light-emitting diode display panel, or a micro light-emitting diode display panel (μLED display).

Finally, the technical features and achievable technical effects of the present invention are summarized as follows:

First, by using the image sensor 100 of the present invention as a basis, combined with the sensing method provided by the present invention, the electrons generated by the background light $R_B$ and the dark current caused the thermal energy in the environment are successfully eliminated. The effect of improving the full well capacity of the equivalent unit pixel 12 is achieved without changing the size of the full well capacity.

Second, the image sensor 100 according to the present invention eliminates the electrons generated by the background light $R_B$ and the dark current caused by the thermal energy in the environment, so that the image sensor 100 according to the present invention can accommodate more effective electrons, thereby improving the signal-to-noise ratio of the image sensor 100 of the present invention.

Third, the present invention solves the problem that the background noise occupies an excessive percentage of the full well capacity compared to the actual signal $R_s$. By eliminating the electrons generated by the background light $R_B$ and the dark current caused by the thermal energy in the environment, The signal-to-noise ratio of the image sensor 100 of the present invention further improves the accuracy of optical fingerprint recognition.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An image sensor, for receiving an incident light including an actual signal and a background noise, the image sensor comprising:
   a substrate;
   a plurality of unit pixels arranged on the substrate, each of the unit pixels comprising a photoelectric conversion element for generating electrons after receiving the incident light;
   a plurality of first polarizers arranged on a first plurality of the unit pixels, each of the first polarizers covering one of the first plurality of the unit pixels, the first polarizers being for changing the incident light into a first incident light having a first polarization direction and including a first background light, and the photoelectric conversion element receiving the first incident light and generating a plurality of first electrons;

a plurality of second polarizers arranged on a second plurality of the unit pixels, each of the second polarizers covering one of the second plurality of the unit pixels, the second polarizers being for changing the incident light into a second incident light having a second polarization direction and including a second background light, and the photoelectric conversion element receiving the second incident light and generating a plurality of second electrons; and a plurality of readout circuits coupled to the unit pixels, each readout circuit performing subtraction and integral operations on the first electrons and the second electrons and generating a voltage signal;

wherein background noise signals corresponding to the first and second background lights are eliminated by the subtraction operation and the voltage signal generated by each readout circuit corresponds to the actual signal.

2. The image sensor according to claim 1, wherein the image sensor is applied in an environment of optical fingerprint recognition.

3. The image sensor according to claim 1, wherein the photoelectric conversion element is a pinned photo diode (PPD).

4. The image sensor according to claim 1, wherein each of the unit pixels further comprise:
   a charge transfer element coupled to the photoelectric conversion element, the charge transfer element transferring the electrons to a corresponding readout circuit; and
   a charge reset element coupled to the charge transfer element, the charge reset element being for resetting the electrons stored in the photoelectric conversion element.

5. The image sensor according to claim 4, wherein each of the unit pixels further comprises: a source follower coupled to the charge transfer element and the charge reset element, the source follower being for reducing effect of parasitic capacitance.

6. The image sensor according to claim 1, wherein a polarization direction of the incident light corresponding to the actual signal is the same as the first polarization direction.

7. The image sensor according to claim 1, wherein an angle between a polarization direction of the incident light corresponding to the actual signal and the first polarization direction is less than 45 degrees.

8. The image sensor according to claim 1, wherein each of the first polarizers and the second polarizers is made of one of a birefringent material and a metal grating.

9. The image sensor according to claim 1, wherein the first polarization direction and the second polarization direction are orthogonal to each other.

10. The image sensor according to claim 1, wherein a first background noise corresponds to a number of electrons generated by the first background light, a second background noise corresponds to a number of electrons generated by the second background light, the first background noise is the same or similar to the second background noise, and polarization directions of the first background light and the second background light are different.

11. The image sensor according to claim 1, wherein each of the readout circuits is a differential integrator.

12. A display device, comprising:
   a display panel, having a display area; and
   an image sensor according to claim 1, disposed on the display panel;
   wherein the image sensor overlaps with the display area correspondingly.

13. The display device according to claim 12, wherein the display panel is a liquid crystal display panel, an organic electroluminescence display panel, an organic light-emitting diode display panel, or a micro light-emitting diode display panel.

14. A sensing method, comprising:
   a polarization step of transmitting an incident light to an image sensor, and using a plurality of first polarizers to change the incident light into a first incident light having a first polarization direction, and a plurality of second polarizers to change the incident light into a second incident light having a second polarization direction, the image sensor having a plurality of unit pixels with each of the first polarizer covering one of a first plurality of the unit pixels and each of the second polarizers covering one of a second plurality of the unit pixels, each of the unit pixels having a photoelectric conversion element;
   a conversion step of using the photoelectric conversion element of each of the unit pixels covered by the first polarizers to generate a plurality of first electrons after receiving the first incident light, and using the photoelectric conversion element of each of the unit pixels covered by the second polarizers to generate a plurality of second electrons after receiving the second incident light;
   an elimination step of using a readout circuit to perform subtraction and integral operations on the first electrons and the second electrons, and generate a voltage signal corresponding to a number of electrons; and
   repeating the above polarization step, conversion step, and elimination step for N times, wherein N is one of 0 and a positive integer;
   wherein the incident light includes an actual signal and a background noise, the first incident light includes a first background light, the second incident light includes a second background light, background noise signals corresponding to the first and second background lights are eliminated by the subtraction operation in the elimination step and the voltage signal generated by the readout circuit corresponds to the actual signal.

15. The sensing method according to claim 14, wherein the sensing method is applied in an environment of optical fingerprint recognition.

16. The sensing method according to claim 14, wherein the photoelectric conversion element is a pinned photo diode (PPD).

17. The sensing method according to claim 14, further comprising the following steps:
   a reset step of using a charge reset element to reset electrons stored in the photoelectric conversion element, the charge reset element being coupled to a charge transfer element and the charge transfer element being coupled to the photoelectric conversion element; and
   a transfer step of using the charge transfer element to transfer electrons to the readout circuit.

18. The sensing method according to claim 17, wherein each of the unit pixels further comprises: a source follower coupled to the charge transfer element and the charge reset element, the source follower being for reducing effect of parasitic capacitance.

19. The sensing method according to claim 14, wherein a polarization direction of the incident light corresponding to the actual signal is the same as the first polarization direction.

20. The sensing method according to claim 14, wherein an angle between a polarization direction of the incident light corresponding to the actual signal and the first polarization direction is less than 45 degrees.

21. The sensing method according to claim 14, wherein each of the first polarizers and the second polarizers is made of one of a birefringent material and a metal grating.

22. The sensing method according to claim 14, wherein the first polarization direction and the second polarization direction are orthogonal to each other.

23. The sensing method according to claim 14, wherein a first background noise corresponds to a number of electrons generated by the first background light, a second background noise corresponds to a number of electrons generated by the second background light, the first background noise is the same or similar to the second background noise, and polarization directions of the first background light and the second background light are different.

24. The sensing method according to claim 14, wherein the readout circuit is a differential integrator.

\* \* \* \* \*